US00RE34244E

United States Patent [19]

Hagiwara

[11] E Patent Number: Re. 34,244

[45] Reissued Date of Patent: May 11, 1993

[54] MULTILINE SLOT MACHINE

[75] Inventor: Takahashi Hagiwara, Zama, Japan

[73] Assignee: Sigma Enterprises, Inc., Tokyo, Japan

[21] Appl. No.: 666,827

[22] Filed: Mar. 6, 1991

Related U.S. Patent Documents

Reissue of:

[64] Patent No.: 4,838,552
Issued: Jun. 13, 1989
Appl. No.: 210,195
Filed: Jun. 20, 1988

U.S. Applications:

[63] Continuation of Ser. No. 846,502, Mar. 27, 1986, abandoned, which is a continuation of Ser. No. 541,231, Oct. 12, 1983, abandoned.

[51] Int. Cl.[5] ..... A63F 09/22

[52] U.S. Cl. ..... 273/138 A; 273/143 R

[58] Field of Search ..... 273/138 A, 143 R, 142 R, 273/DIG. 28; 364/410, 411, 412

[56] References Cited

U.S. PATENT DOCUMENTS

| | | | |
|---|---|---|---|
| 3,129,004 | 4/1964 | Ritzler | 273/143 R |
| 3,256,022 | 6/1966 | Dreiblatt | 273/143 R |
| 3,913,922 | 10/1975 | Richards et al. | 273/143 R |
| 4,006,904 | 2/1977 | Felsher | 273/138 A |
| 4,099,722 | 7/1978 | Rodesch et al. | 273/143 R |
| 4,240,635 | 12/1980 | Brown | 273/138 A |
| 4,326,351 | 4/1982 | Heywood et al. | 273/143 R |
| 4,517,558 | 5/1982 | Davids | 273/143 R |

FOREIGN PATENT DOCUMENTS

| | | |
|---|---|---|
| 24556 | 2/1976 | Japan . |
| 90192 | 9/1977 | Japan . |
| 1184 | 1/1981 | Japan . |
| 75981 | 4/1981 | Japan . |
| 131469 | 8/1982 | Japan . |
| 57-181170 | 10/1982 | Japan . |
| 57-198056 | 11/1982 | Japan . |
| 57-201388 | 11/1982 | Japan . |
| 1466765 | 3/1972 | United Kingdom . |

OTHER PUBLICATIONS

"Ocean-to-Ocean" slot machine manufactured by Data East Corporation, published in 1981.

*Game Machine*, No. 157, Jan. 1981.

"Raven Continental" slot machine, published in 1973 at a Tokyo trade show.

*Primary Examiner*—Theatrice Brown
*Assistant Examiner*—Jessica J. Harrison
*Attorney, Agent, or Firm*—Skjerven, Morrill, MacPherson, Franklin & Friel

[57] ABSTRACT

A more sophisticated version of the known "crisscross" type of slot machine is disclosed. A screen has a plurality of display zones, usually notional, arrayed in rows and columns. A row of symbols are made to sequentially appear and randomly stop on each of the display zones, either electronically, optically, or mechanically. Thus the player can play for random symbol combinations not only along the horizontal and diagonal lines, as in the case of the crisscross model, but also along the vertical lines, of the array of display zones on the screen. If the display zones are provided in three rows and three columns, therefore, the inventive machine offers a maximum of as many as eight different symbol combinations on a single play, as compared with only five yielded by the crisscross type of machine. A representative slot machine in accordance with the invention is purely electronic, using a cathode ray tube for symbol display.

4 Claims, 5 Drawing Sheets

| PAY LINE | WINNING COMBINATION | PAYOUT RATE |
|---|---|---|
| 100 | | |
| ⋮ | ⋮ | ⋮ |
| 800 | 4 4 4 | 250 |

MULTILINE SLOT MACHINE

Matter enclosed in heavy brackets [ ] appears in the original patent but forms no part of this reissue specification; matter printed in italics indicates the additions made by reissue.

This is a continuation of application Ser. No. 846,502, filed Mar. 27, 1986, now abandoned, which is a continuation of Ser. No. 541,231, filed Oct. 12, 1983, now abandoned.

BACKGROUND OF THE INVENTION

This invention relates to slot machines or coin operated gaming machines for playing on random combinations of symbols such as figures, pictures or characters. More specifically the invention pertains to a novel multiline slot machine capable of providing a far greater number of playable symbol combinations per number of symbol display zones heretofore, thereby adding to the fun and amusement of the player.

Poulsen et al. U.S. Pat. No. 4,097,048, dated June 27, 1978, and Andersen U.S. Pat. No. 4,138,114, dated Feb. 6, 1979, both disclose slot machines of typical conventional design. In either case the machine comprises three reels, otherwise called drums, wheels, etc., that are mounted on a common shaft for rotation independently of each other. Each reel bears an annular row of symbols on its peripheral surface. Some symbols on each reel may be alike, but the arrangement of the symbols usually differs from reel to reel. The reels are set into rotation, as by a pull of a handle, and are made to stop in different positions. The player wins the game if a predetermined combination of symbols appears through a window extending across the reels.

A more complex symbol display is offered by a multiline "crisscross" type of machine disclosed, for instance, in Rodesch et al. U.S. Pat. No. 4,099,722 dated July 11, 1978. A typical "crisscross" model simultaneously displays randomly selected symbols in an array of three rows and three columns. Its display screen or window exhibits a total of five pay lines, three horizontal ones and two crossing diagonal ones. Winning and nonwinning combinations of symbols appear along all these pay lines.

For playing on such a multiline slot machine the player must deposit a coin or coins of a required denomination or denominations to choose one, some, or all of the pay lines. He wins if the symbols stop in a prescribed combination or combinations along the line or lines of his choice. The rate of payout (i.e. the ratio of payout to payin) may differ from line to line. In the event of the concurrence of two or more winning combinations along the preselected pay lines the machine will sum up the required amounts and pay the total.

A recent breakthrough in the slot machine art is the use of a cathode ray tube (CRT) for symbol display. As heretofore constructed the "vide slot" machine has simulated the symbol display by the more conventional reel type machines. The CRT screen has displayed vertical rows of symbols as if they were on revolving reels mounted on a common shaft, although, of course, the movement and random stops of the symbol rows are controlled purely electronically. Thus the conventional video slot machine has also been capable of offering only horizontal or diagonal pay lines.

As is apparent from the foregoing study of the prior art, all conventional slot machines have afforded only a pay line or lines extending across the symbol bearing reels, with diagonal lines further yielded by "crisscross" models. No device has so far been suggested which has pay lines in the direction of symbol movement. This only natural because the conventinal belief has been that the rows of symbols to be displayed by the slot machine must be borne by respective reels, either acutal or imaginary, that rotate about one and the same axis. No rule exists, however, that the slot machine must be such.

The contingency or randomness of symbol combinations is the foundation stone of the slot machine. Symbol combinations across the reels, whether horizontal or diagonal, are haphazard since the reels have different symbol arrangements and revolve and stop under different conditions. Prescribed payout rates are allotted to payout lines in such directions depending upon the probability of the occurence of specific symbol combinations. No payout is possible for predetermined symbol combinations. The conventional slot machine constructions inhibit the provision of pay lines in the direction of symbol movement because symbol arrangements in that direction are predetermined.

The foregoing will have made clear that the conventional belief that the rows of symbols must essentially revolve about a common axis has been a bar to a greater variety of random symbol combinations and, therefore, to the greater enjoyment of the player.

SUMMARY OF THE INVENTION

The present invention has an object to increase, in a multiline slot machine, the number of playable symbol combinations per number of symbols displayed statically at one time and hence to enhance the enjoyment and excitement of the customer.

Stated in brief, the invention provides a multiline slot machine comprising display means having a plurality of display zones arrayed in rows and columns thereon. Symbol bearing means is provided which includes a pllurality of symbol groups provided on for each display zone of the display means and each having M kinds of N symbols, the M and N being both integers and the M being not more than the N. Each group of symbols are adapted to be successively displayed and randomly stopped on one display zone of the display means.

Thus the invention is based upon the obvious, but heretofore unrecognized, fact that the groups of symbols to be displayed by a multiline slot machine need not revolve about a common axis, or that each group of symbols need not be displayed on one column (or row) of display zones. Instead, in accordance with the invention, one group of successively changeable, randomly stoppable symbols is provided for each of the arrayed display zones of the display means. This makes it possible to provide pay lines in the direction hitherto totally unthought of, that is, the direction of symbol movement, which is customarily vertical.

As has been mentioned, the conventional "crisscross" model having display zones arranged in three rows and three columns offers five pay lines, three horizontal ones and two diagonal ones. For this type of machine the invention provides as many as eight pay lines, by adding three vertical ones to the standard three horizontal and two diagonal ones.

A preferred embodiment of the invention employs a cathode ray tube (CRT) as the display means and a memory as the symbol bearing means. The CRT has a notional array of display zones on its screen. The memory stores the groups of symbols in coded form, for readout and display as symbols on the respective display zones of the CRT screen. However, the sequential display and random stoppage of symbols on the respective display zones in accordance with the invention is possible not only electronically but also optically or mechanically.

The above and other objects, features, and advantages of this invention and the manner of attaining them will become more apparent, and the invention itself will best be understood, from a study of the following description and appended claims taken together with the attached drawings.

DETAILED DESCRIPTION OF THE INVENTION

Figure 1:
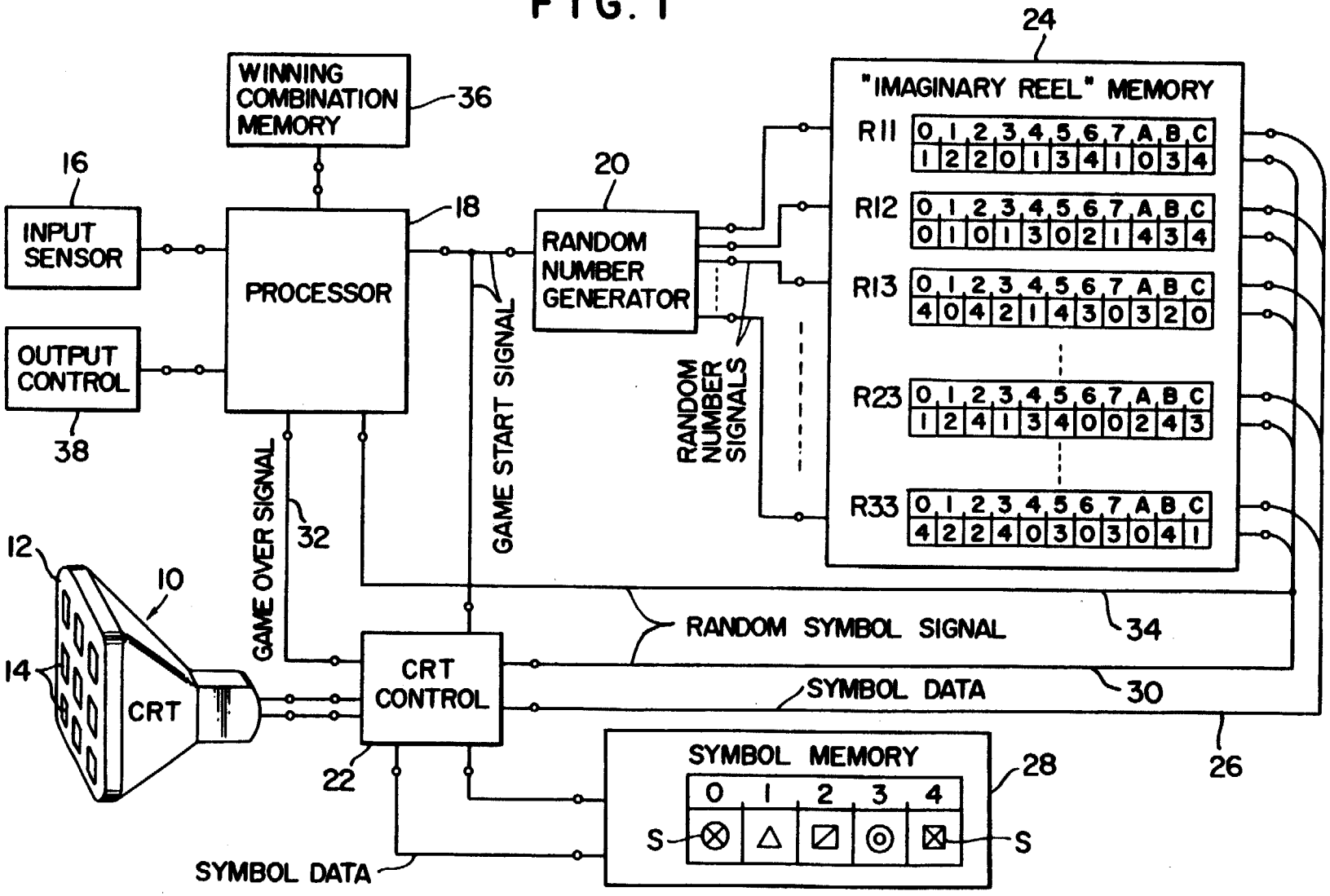
FIG. 1 is a schematic block diagram of the electronic multiline slot machine embodying the principles of the present invention, the slot machine employing a CRT for symbol display.

The novel concepts of this invention are shown in FIG. 1 as embodied in an electronic slot machine having a CRT 10 of any known suitable design for symbol display. The CRT 10 conventionally includes a luminescent screen 12. This CRT screen has a notional array of display zones 14 each of which is provided for the display of one group of symbols such as pictures, figures, or characters.

Figures 2, 3:
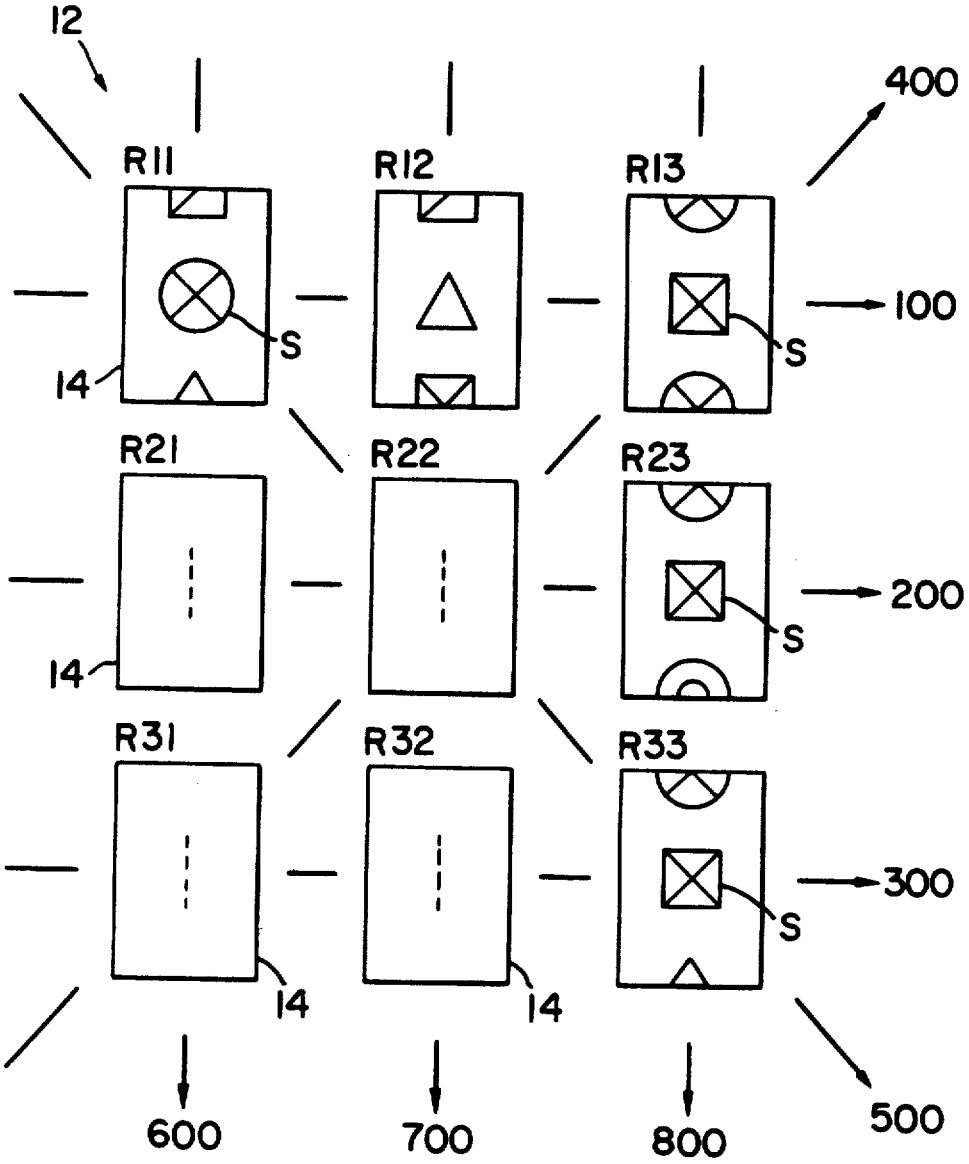
FIG. 2 is a schematic representation of the array of display zones on the CRT screen of the elctronic multiline sllot machine of FIG. 1.
FIG. 3 is a table listing, by way of example, the winning symbol combinations and payout rates for the various pay lines in the slot machine of FIG. 1 as stored in the winning combination memory used therein.

As better depicted in FIG. 2, the notional display zones 14 on the CRT screen 12 are arranged in three rows and three columns in this particular embodiment. Each display zone displays its own group of symbols S, which travel in a row in the direction of the columns and come to a random stop totally independently of the other symbol groups, in accordance with the teachings of the invention. Thus the slot machine has the following eight pay lines:

1. Upper horizontal line 100.
2. Center horizontal line 200.
3. Lower horizontal line 300.
4. First diagonal line 400 (lower left to upper right).
5. Second diagonal line 500 (upper left to lower right).
6. Left vertical line 600.
7. Center vertical line 700.
8. Right vertical line 800.

The three horizontal lines 100, 200, 300, and two diagonal lines 400 and 500 make up in combination the familiar "crisscross" arrangement of paylines. However, the three vertical lines 600, 700 and 800, extending in the direction of symbol movement, are novel and represent the concepts of this invention. It is undestood that the slot machine with such multiple pay lines accepts prescribed numbers of coins to enable the player to select one, some, or all of the pay lines for each play.

With reference back to FIG. 1 there is provided an input sensor 16 which puts out a pay line, corresponding to the number of coins that have been inserted in a coin slot, not shown, of the machine by the player. The pay line signal is delivered to a processor 18. After the deposit of a desired number of coins the player may proceed to manipulate a pull handle or equivalent means, not shown, whereupon the input sensor 16 activates the processor 18 to cause same to produce a game start signal.

The processor 18 is coupled to both random number generator 20 and CRT control 22 for the delivery of the game start signall thereto. The random number generator 20 can be of known configuration capable of generating a set of random numbers in response to the game start signal, for the random selection of symbols for display on the CRT scrreen 12.

Connected to receive the outputs from the random number generator 20 is an imaginary reel memory 24 which can be a read only memory (ROM) available commerically as an integrated circuit device. The imaginary reel memory 24 has stored therein a purality of "imaginary reels" R11, R12, R13, R21, R22, R23, R31, R32 and R33. As will be seen also from FIG. 2, these imaginary reels correspond to the resoective display zones 14 on the CRT screen 12. Since the number of display zones 14 is nine in this embodiment, so is the number of imaginary reels stored in the memory 24, although FIG. 1 shows only five imaginary reels R11, R12, R13, R23 and R33 for simplicity.

Each imaginary reel in the memory 24 comprises M kinds of N coded symbols, M being equal to or less than N. In this particular embodiment each imaginary reel has five kinds of coded symbols "0" through "4" stored in eleven storage locations having addresses "0" through "7" and "A" through "C" in hexadecimal notation. Accordingly, in each imaginary reel, each coded symbol is stored in one or two or more preassigned locations. The arrangement of the coded symbols differs, of course, from reel to reel. One coded symbol of each imaginary reel is to be randomly selected by the set of random numbers delivered from the random number generator 20.

A bus connection 26 between the CRT control 22 and imaginary reel memory 24 enables the former to read out the stored information from the latter for the sequential display, with the aid of a symbol memory 28, of the groups of symbols S on the respective display zones 14 of the CRT screen 12. The symbol memory 28, which can also be a commercially availave ROM, has written therein the five actual symbols S corrrespondng to the respective coded symbols "0" through "4".

Another bus connection 30 between the CRT control 22 and imaginary reel memory 24 is intended for the delivery, from the latter to the former, of a random symbol signal representative of the coded symbols and their addresses that have ben picked up at random by the outputs from the random number generator 20. In response to the random signal from the imaginary reel memory 24 the CRT control 22 causes the CRT 10 to terminate the sequential display of the symbol groups for a static display of the randomly selected symbols. The CRT control 22 delivers a reel stop signal to the processor 18 by way of a bus 32 upon static exhibition of the randomly selected symbols on the respective display zones 14 of the CRT screen 12.

A bus 34, branching from the bus 30, leads to the processor 18. This bus 34 directs the random symbol signal from imaginary reel memory 24 to processor 18.

Also connected to the processor 18 is a winning combination memory 36 which may take the form of a ROM. As tabulated in FIG. 3, the winning combination memory 36 has stored therein the winning combinations of symbols and payout rates for the eight pay lines 100, 200, 300, 400, 500, 600, 700 and 800 indicated in FIG. 2.

The processor 18 is further coupled to an output control 38 which can be known electronmechanical design capable of dispensign coins as dictated by the processor. On receipt of the pay line signal from the input sensor 16 and the random symbol signal from the imaginary reel memory 24, the processor 18 refers to the winning combination memory 36 find out any winning combination or combinations of the randomly selected symbols along the pay line or pay lines chosen by the player. In the event of a winning play the processor 18 causes the output control 38 to pay out a requisite amount of coins.

Operation

Figure 4:
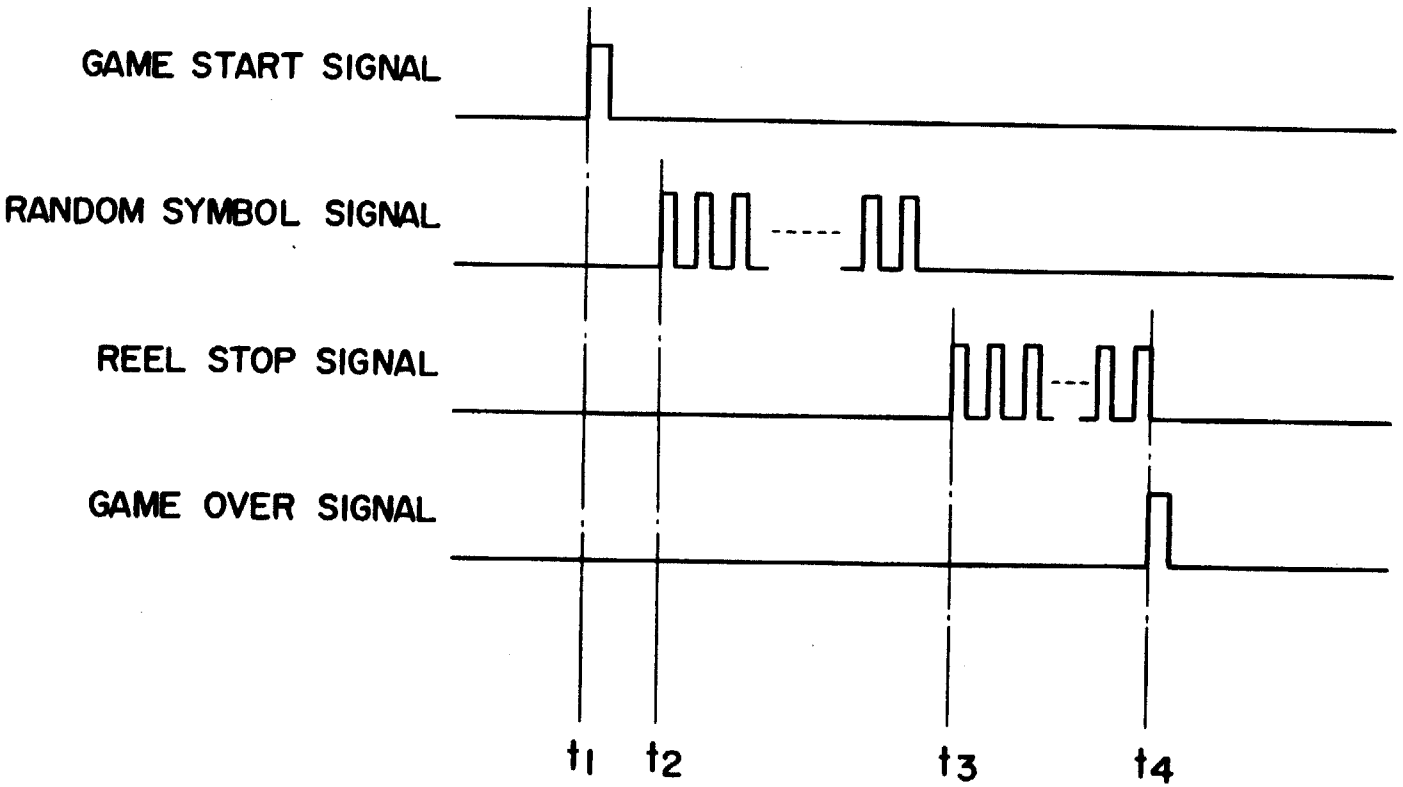
FIG. 4 is a graphic, sequential representation of various signals useful in explaining the operation of the slot machine of FIG. 1.

The operation of the above exemplified electronic slot machine will be understood by referring to the signal waveform diagram of FIG. 4, in addition to FIGS. 1 through 3. As the player deposits any of several specified amounts of coins, the input sensor 16 will deliver a corresponding pay line signal to the processor 18. Let us assume that he has payed for all of the eight pay lines 100 through 800 for the convenience of description.

As the player subsequently activates the unshown handle or the like, the input sensor 16 causes the processor 18 to put out a game start signal for delivery to both the random number generator 20 and the CRT control 22.

FIG. 4 indicates the production of the game start signal at a moment t1 in time. The CRT control 22 immediately responds to this signal and, in coaction with the imaginary reel memory 24 and symbol memory 28, causes the CRT 20 to display the successive rows of symbols S on the respective display zones 14 of its screen 12. The display images travel vertically through the display zones 14, thus simulating rolling reels.

The random number generator 20 also responds to the game start signal to apply random number signals to the respective "imaginary reels" R11, R12, R13, R21, R22, R23, R31, R32 and R33 of the imaginary reel memory 24. Then, at a second moment t2 following the first recited moment t1, the imaginary reel memory 24 starts producing a random symbol signa representative of a random set of coded symbols and their addresses in the imaginary reel memory 24 that have been selected, one form each imaginary reell, by the random number signals. This random symbol signal enters both the processor 18 and the CRT control 22.

Let it be supposed that the set of random number signals have picked up the addresses "3", "7", "0", "5" and "B" of the "imaginary reels" R11, R12, R13, R32 and R33, respectively, in the imaginary reel memory 24 of FIG. 1. Then, as pictured in FIG. 2, the same symbol image corresponding to the coded symbol "4" will appear in each of the right hand column of display zones 14 (pay line 800). This symbol combination along the pay line 800 is a winning combination, as indicated in FIG. 3, that is entitled to a payout at a rate of 250 times the payin. The processor 18 senses the winning symbol combination by referring the incoming random symbol signal to the winning combination memory 36.

The sensing of the winning symbol combination by the processor 18 is completed at a third moment t3, whereupon the CRT control 22 delivers a succession of reel stop pulses to the CRT 10. The reel stop pulses are intended to stop the "rolling" of the "imaginary reels" on the CRT screen 12 one after another. Of course, when the "imaginary reels" are so stopped, the randomly selected symbols become displayed centrally on the respective display zones 14 on the CRT screen 12 as shown in FIG. 2. At this time, the half part of each of two symbols next to the selected symbol is also respectively displayed on the upper and lower portions of each zone 14 simultaneously with the selected symbol and in general the half symbols displayed on the respective zones 14 are different from one another. Therefore, the player can notice easily that the respective imaginary reels are independent of one another.

At a subsequent moment t4, when the final "imaginary reel" comes to a stop on CRT screen 12, the CRT control 22 applies a game over signal to the processor 18. Then the processor activates the output control 38 for the dispensation of the requisite amount of coins.

Alternate Embodiment

Figure 5:
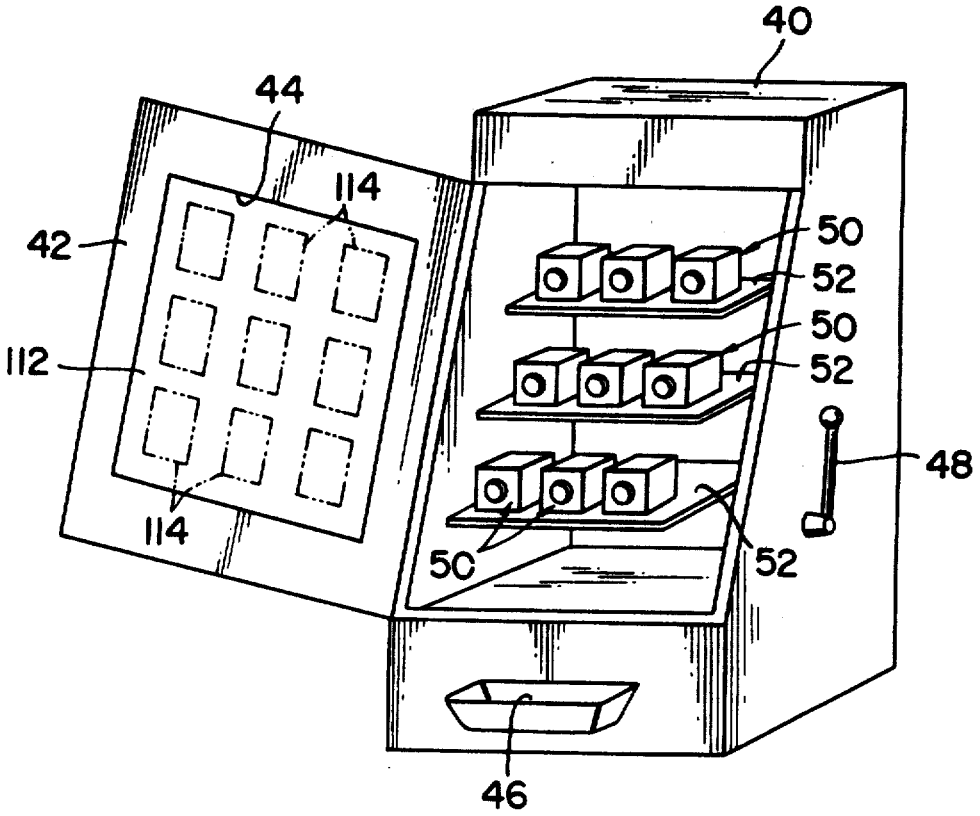
FIG. 5 is a perspective view of another preferred form of the multiline slot machine in accordance with the invention, the slot machine incorporating an array of projectors for symbol display.
Figure 6:
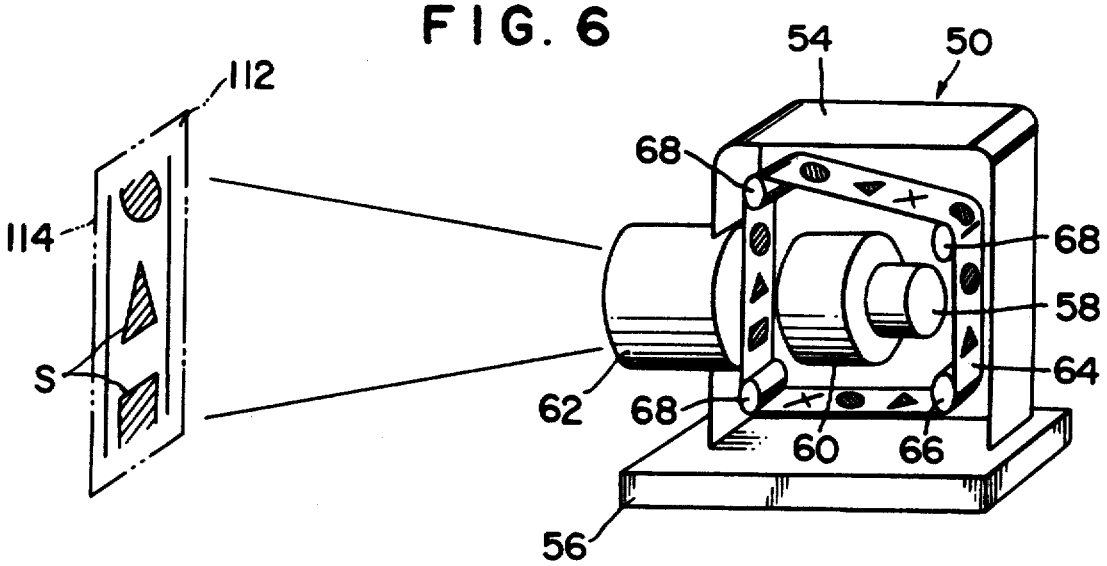
FIG. 6 is an enlarged perspective view of one of the projectors in the slot machine of FIG. 5, the projector being shown with its enclosure partly removed to reveal the inner details.

FIGS. 5 and 6 illustrate another preferable form of the multiline slot machine in accordance with the invention. With reference to FIG. 5 slot machine includes a housing 40 having a front door 42 hingedly attached thereto. The front door 42 is centrally apertured at 44 to provide a display screen 112. This display screen has a notional array of display zones 114 which are shown arranged in three rows and three columns by way of example. A coin drop tray 46 is provided on the front face of the housing 40, just under the door 42, for payout in the event of a winning play. On one of the side walls of the housing 40 is a handle 48 to be activated by the player for placing the machine into operation after deposit of a required number of coins.

Provided within the housing 40 are a plurality of projector assemblies 50 disposed one behind each dispaly zone 114 of the screen 112. Since the display aones 114 are arranged in three rows and three columns in this embodiment, the projector assemblies 50 are arrayed correspondingly, with each row of three projector assemblies mountes on one shelf 52 within the housing 40.

FIG. 6 illustrates one of the projector assemblies 50 in perspective and on an enlarged scale, the other projector assemblies being all identical with the one shown. The representative projector assembly 50 has an enclosure 54 having an enlarged bottom or base 56. The enclosure 54 accommodates a light source 58 and, in front of it, two successive lens systems 60 and 62 or equivalent means.

Passing between the two lens systems 60 and 62 of each projector assembly 50 is a loop of film 64 which extends around a drive roll 66 and three guide rolls 68. The drive roll 66 is operatively cuopled to suitable means for longitudinally moving and randomly stopping the film 64.

Each film 64 bears M kinds of N symbols in a row to be imaged by the projector 50 on one display zone 114 of the screen 112. The symbol images on the display zone 114 are indicated at S in FIG. 6.

It will now be apparent that the multiline slot machine of FIGS. 5 and 6 is very much akin to that of FIG. 1 in that the groups of symbols are displayed or imaged on the respective display zones arranged in rows and columns on the screen.

In this alternate slot machine, too, the player may pull the handle 48 after depositing a required quantity of coins to select one, some, or all of the eight pay lines which are assumed to be depicted on the screen 112 as in FIG. 2. Pulling the handle 48 sets the driver rolls 66 of all the projector assemblies 50 into rotation in the same direction, with the result that the looped films 64 travel around the rolls 66 and 68. The projector assemlies 50 project the images of the film symbols on the respective display zones 114 of the screen 112, with the symbol images flowing in a predetermined direction. Then the drive rolls 66 are stopped in a random fashion, by means well known in the art, to cause random combinations of symbol images to appear centrally of the respective display zones 114. For example, the drive rolls 66 are respectively connected to corresponding pulse motors which are controlled by a control unit (not shown). The control unit puts out stop signals to the respective pulse motors at random.

Means for detecting winning and nonwinning combinations of the randomly stopped symblos in this type of machine are also familiar to the specialists. In the event of a winning play the machine will dispense a prescribed amount of coins into the drop tray 46.

It will be understood that the projector assemblies 50 find use in this type of slot machine with means other than the looped films 64. An obvious alternative is a transparent disc bearing an annular row of imageabe symbols. Further, as has been mentioned, the discrete display zones 114 may be only notional. The screen 112 may therefore take the form of a pane of frosted glass or like piece of panel.

Second Alternate Embodiment

Figure 7:
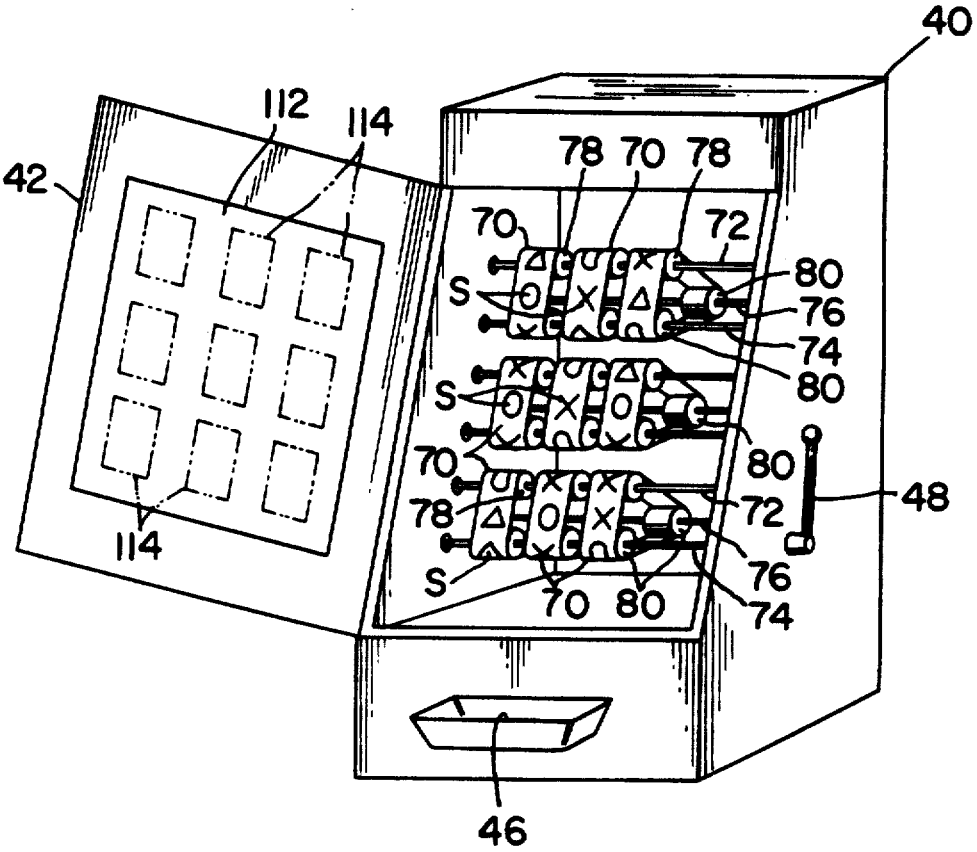
FIG. 7 is a perspective view of still another preferred form of the multiline slot machine in accordance with the invention which includes an array of endless belt assemblies for symbol display.

In FIG. 7 is shown still another preferred form of the multiline slot machine in accordance with the invention. This embodiment employs endless bolts 70 each having a row of symbols S drawn or otherwise provided thereon for direct display.

Like the FIGS. 5 and 6 embodiment this second alternate embodiment has the housing 40 with the hinged front door 42. The screen 112 fitted in this front door has the notional display zones 114 in three rows and three columns. The housing 40 is further furnished with the drop tray 46 and handle 48.

Within the housing 40 there are provided three shaft groups each comprising three shafts 72, 74 and 76 extending horizontally in parallel spaced relation to each other across one row of display zones 114 of the screen 112. The front, upper shaft 72 of each shaft group has three drive rolls 78 mounted thereon for rotation independently of each other. Each of the other two shafts 74 and 76 of each shaft group has three guide rolls 80 mounted thereon for independent rotation.

Wrapped around the respective sets of three rolls, one drive roll 78 and two guide rolls 80, are symbol bearing members in the form of endless belts 70 having M kinds of N symbols S suitably provided thereon in a row. It will be seen that the symbol bearing belts 70 lie behind the respective display zones 114 of the screen 112 for direct symbol display therethrough as they entend between the two forwardly positioned rolls 78 and 80.

Like the looped films 64 of the FIGS. 5 and 6 embodiment the symbol bearing endless belts 70 are to be independentlly moved longitudinally by the respective drive rolls 78 for the sequential display of the rows of symbols S through the respective display zones 114 of the screen 112. Then the rotation of the drive rolls 78 are arrested at random, with the result that random combinations of the symbols appear along the rows, along the columns, and diagonally of the array of display zones 114. It is therefore apparent that the slot machine of FIG. 7 can also provide a total of eight pay lines in these directions of the nine arrayed display zones 114. The other details of construction and operation are considered self-evident from the foregoing description of the two preceding embodiments.

As an obvious modification of the FIG. 7 embodiment the length of each endless belt 70 may be increased, possibly with use of a greater number of guide rolls, for a greater variety of symbols to be borne thereby. Further, instead of the endless belts, an array of symbol bearing reels may be provided behind the respective display zones for independent rotation and random stoppage.

Additional modifications or alternations of the above disclosed embodiments will readily occur to those skilled in the art within the broad teaching thereof.

What is claimed is:

1. A multiline slot machine comprising:

(a) an electronic display means having a plurality of independent display zones for simultaneously displaying images flatly, the independent display zones being arrayed in rows and columns thereon wherein the number of rows and columns is greater than one and wherein each of said plurality of independent display zones represents one of a plurality of independent imaginary reels of said multiline slot machine;

(b) memory means for storing therein a plurality of symbol groups one of which is provided for each indenpendent display zone, each symbol group having M kinds of N symbols, N being at least equal to M, each symbol being adapted to be successively displayed and randomly stopped on one independent display zone of the display means, the memory means comprising a storing means for storing therein a plurality of arrangements each having a plurality of storage locations or addresses and a plurality of coded symbols one of which corresponds to one of the each storage location, one of the arrangements being provided fro each independent display zone, and an image symbol memory having an arrangement of a plurality of the coded symbols and a plurality of image symbols one of which corresponds to each coded symbol;

(c) display control means connected between the display means and the memory means for causing the display means to sequentially display the symbols of the symbols group on the respective independent display zones of the display means, each randomly selected symbol being displayed at the center of each display zone in a state wherein half of each of two symbols next to the selected symbol is respectively displayed on a upper and lower poriton of each independent display zone; and (d) means for randomly selecting one symbol of each symbol group stored in the memory means, the display control means being responsive to the randomly selecting means for causing the display means to stop the sequential display of the symbols at the randomly selected symbols;

whereby the slot machine shows, on the display means, alignment and non-alignment of matching randomly selected symbols in the horizontal, vertical and diagonal directions of the array of independent display zones of the display means, and said randomly selected symbol and said half of two symbols next to the selected symbol displayed in each of said plurality of independent display zones shows a player that each of said plurality of independent display zones is an independent imaginary reel.

2. A multiple slot machine according to claim 1, wherein the random selecting means comprises a random number generator for selecting a location or an address of each arrangement in the memory means and a CRT control means for reading out the coded symbols corresponding to selected locations or addresses to select image symbols corresponding to the coded symbols read out of said memory means by the CRT control means thereby send image signals to said independent display zones of said display means which comprises a CRT.

*3. A machine comprising:*

*(a) an electronic display means for displaying a plurality of independent display zones for simultaneously displaying images flatly, the independent display zones being arrayed in rows and columns thereon wherein the number of rows and columns is greater than one and wherein each of said plurality of independent display zones represents one of a plurality of independent imaginary reels of said machine;*

*(b) memory means for storing therein a plurality of symbol groups, one of which is provided for each independent display zone, each symbol group having M kinds of N symbols, N being at least equal to M, each symbol being adapted to be successively displayed and randomly stopped on one independent display zone of the display means, the memory means comprising a storing means for storing therein a plurality of arrangements of coded symbols, an arrangement being provided for each independent display zone, and an image symbol memory for converting said coded symbols to image symbols for display;*

*(c) display control means connected between the display means and the memory means for causing the display means to sequentially display the symbols of the symbol groups on the respective independent display zones of the display means, each randomly selected symbol being displayed at the center of each display zone in a state wherein a portion of each of two symbols next to the selected symbol is respectively displayed on a upper and lower portion of each independent display zone; and*

*(d) means for randomly selecting one symbol of each sumbol group stored in the memory means, the display control means being responsive to the randomly selecting means for causing the display means to stop the sequential display of the symbols at the randomly selected symbol,*

*whereby the machine shows, on the display means, alignment and non-alignment of matching randomly selected symbols in the horizontal, vertical and diagonal directions of the array of independent display zones of the display means.*

*4. A machine according to claim 3, wherein the random selecting means comprises:*

*a random number generator for selecting a coded symbol within each arrangement of coded symbols in the memory means; and*

*a CRT control means for reading out the selected coded symbols within said arrangements of coded symbols in said memory means, selecting image symbols corresponding to the selected coded symbols read out of said memory means, and sending image signals to said independent display zones of said display means, said display means comprising a CRT.*

* * * * *

UNITED STATES PATENT AND TRADEMARK OFFICE

CERTIFICATE OF CORRECTION

PATENT NO. : Re. 34,244
DATED : May 11, 1993
INVENTOR(S) : Takashi Hagiwara

It is certified that error appears in the above-identified patent and that said Letters Patent is hereby corrected as shown below:

On title page, item [75] change inventor's name to --Takashi Hagiwara--

Col. 2, line 9, delete "acutal" and insert --actual--.

Col. 2, line 41, delete "pllurality" and insert --plurality--.

Col. 4, line 64, delete "availave" and insert --available--.

Col. 5, line 65, delete "signa" and insert --signal--.

Col. 7, line 37, delete "symblos" and insert -symbols--.

Col. 7, line 44, delete "imageabe" and insert --imaged--.

Signed and Sealed this

Twenty-fourth Day of May, 1994

Bruce Lehman

BRUCE LEHMAN

*Commissioner of Patents and Trademarks*

*Attest:*

*Attesting Officer*